United States Patent
Igarashi (10) Patent No.: US 11,818,633 B2
(45) Date of Patent: Nov. 14, 2023

(54) MAP UPDATE SYSTEM, DATA TRANSMISSION DEVICE, AND DATA TRANSMISSION METHOD

(71) Applicant: TOYOTA JIDOSHA KABUSHIKI KAISHA, Toyota (JP)

(72) Inventor: Ryo Igarashi, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 288 days.

(21) Appl. No.: 17/220,451

(22) Filed: Apr. 1, 2021

(65) Prior Publication Data

US 2021/0312228 A1 Oct. 7, 2021

(30) Foreign Application Priority Data

Apr. 6, 2020 (JP) .................. 2020-068650

(51) Int. Cl.
| | |
|---|---|
| *H04W 4/38* | (2018.01) |
| *H04W 4/44* | (2018.01) |
| *G06F 18/211* | (2023.01) |
| *G06F 18/22* | (2023.01) |
| *G06F 18/25* | (2023.01) |
| *G06V 10/80* | (2022.01) |
| *G06V 20/56* | (2022.01) |

(52) U.S. Cl.
CPC .............. *H04W 4/38* (2018.02); *G06F 18/211* (2023.01); *G06F 18/22* (2023.01); *G06F 18/254* (2023.01); *G06V 10/809* (2022.01); *G06V 20/588* (2022.01); *H04W 4/44* (2018.02); *G06V 20/56* (2022.01)

(58) Field of Classification Search
CPC ......... H04W 4/38; H04W 4/44; G06F 18/211; G06F 18/22; G06F 18/254
USPC .......................................... 382/104
See application file for complete search history.

(56) References Cited

U.S. PATENT DOCUMENTS

2016/0282127 A1* 9/2016 Goto .................. G01S 5/0027
2019/0187723 A1 6/2019 Tao et al.
(Continued)

FOREIGN PATENT DOCUMENTS

JP  2011-002445 A  1/2011
JP  2013-242607 A  12/2013
(Continued)

*Primary Examiner* — Ayodeji O Ayotunde
(74) *Attorney, Agent, or Firm* — Sughrue Mion, PLLC (57) ABSTRACT

A map update system includes a data transmission device mounted on a vehicle and a map server which stores map data. The data transmission device generates sensor data representing a road environment of surroundings of the vehicle in a predetermined position, calculates a matching degree between the road environment of the surroundings of the vehicle and a road environment in the predetermined position represented by the map data, and causes a communication circuit mounted on the vehicle to transmit the sensor data and information representing the matching degree to the map server. The map server transmits the map data by utilizing sensor data, among the sensor data received via a communication device, having a matching degree less than a matching degree threshold with a higher priority than sensor data having a matching degree or greater than the matching degree threshold.

8 Claims, 8 Drawing Sheets

(56) References Cited

U.S. PATENT DOCUMENTS

2019/0316915 A1   10/2019   Koda et al.
2020/0400440 A1*  12/2020   Stenneth ............... G06F 18/22

FOREIGN PATENT DOCUMENTS

JP   2019-145077 A   8/2019
WO   2017/212639 A1  12/2017

* cited by examiner

MAP UPDATE SYSTEM, DATA TRANSMISSION DEVICE, AND DATA TRANSMISSION METHOD

CROSS-REFERENCE TO RELATED APPLICATION

This application claims priority to Japanese Patent Application No. 2020-068650 filed on Apr. 6, 2020, and is incorporated herein by reference in its entirety.

FIELD

The present disclosure relates to a map update system comprising a data transmission device and a map server, a data transmission device, and a data transmission method.

BACKGROUND

It is necessary for the maps referenced by the autonomous driving system of a vehicle in order to control the autonomous driving of the vehicle to accurately represent the road environment. Thus, the transmission of images showing the road environment of the surroundings of the vehicle acquired by a camera mounted on a vehicle to a map generation server, and the generation of a map using the images received by the map generation server has been proposed.

Japanese Unexamined Patent Publication (Kokai) No. 2013-242607 (hereinafter referred to as Patent Literature 1) describes a data supply system in which a first cycle of transmitting sensor data acquired by a vehicle to a roadside gateway server is determined so as to be shorter than a second cycle of transmitting the sensor data accumulated in the roadside gateway server to a central server.

SUMMARY

When updating a map in a server, the importance of the sensor data transmitted from the vehicle differs for each set of sensor data. According to the technology of Patent Literature 1, the sensor data acquired in the vehicle is uniformly processed, and the differences in importance for each set of sensor data is not considered. Thus, highly important data is treated like other data when updating the map.

The present disclosure aims to provide a map update system with which highly important data can be reflected with priority in the updating of a map.

A map update system according to the present disclosure comprises a data transmission device mounted on a vehicle and a map server which stores map data, wherein the data transmission device comprises a sensor data generation unit which generates sensor data representing a road environment of surroundings of the vehicle in a predetermined position based on a signal generated by a sensor mounted on the vehicle, a matching degree calculation unit which calculates a matching degree between the road environment of the surroundings of the vehicle represented by the sensor data and a road environment in the predetermined position represented by the map data, and a sensor data transmission unit which causes a vehicle communication unit mounted on the vehicle and capable of communicating with the with map server to transmit the sensor data and information representing the matching degree to the map server, and the map server comprises:

a server communication unit capable of communicating with the vehicle communication unit, and a map data update unit which updates the map data by utilizing first sensor data, among the sensor data received via the server communication unit, having a matching degree less than a matching degree threshold with a higher priority than second sensor data, among the sensor data received via the server communication unit, having a matching degree equal to or greater than the matching degree threshold.

In the map update system according to the present disclosure, it is preferable that a map data update unit of the map server update the map data so that a necessary update time elapsing from when the sensor data for the first sensor data is received to when it is used for updating the map data is shorter than the necessary update time for the second sensor data.

In the map update system according to the present disclosure, it is preferable that the map server comprise a memory, and the map data update unit of the map server store the first sensor data in the memory during a first storage period and store the second sensor data in the memory during a second storage period, which is shorter than the first storage period.

In the map update system according to the present disclosure, it is preferable that the map data update unit of the map server update the map data using the received first sensor data, and update the map data using the second sensor data when the number of sets of received third sensor data representing the road environment common in the road environment of the surroundings of the vehicle represented by the received second sensor data, among the sensor data, exceeds a numerical threshold.

In the map update system according to the present disclosure, it is preferable that the map data update unit of the map server execute, for the first sensor data, a first process, which is a part of a predetermined preprocess executed for the sensor data, from the reception of the first sensor data to the update of the map data, and execute a second process different from the first process in the predetermined preprocess after updating the map data, and execute, for the second sensor data, the first process and the second process from the reception of the second sensor data to the update of the map data.

In the map update system according to the present disclosure, it is preferable that the sensor be a camera which generates an image in which an environment of the surroundings of the vehicle is represented as the signal, the sensor data generation unit generate sensor feature data as the sensor data in which a feature identified by a classifier for identifying predetermined features from the image is represented as the road environment of the surroundings of the vehicle, and a matching degree calculation unit calculate a matching degree between the sensor feature data and map feature data in which a feature is represented as the road environment in the predetermined position represented by the map data as the matching degree.

A data transmission device according to the present disclosure comprises a sensor data generation unit which generates sensor data representing a road environment of surroundings of a vehicle in a predetermined position based on a signal generated by a sensor mounted on the vehicle, a matching degree calculation unit which calculates a matching degree between the road environment of the surroundings of the vehicle represented by the sensor data and a road environment in the predetermined position represented by map data stored in a map server in association with a position, and a sensor data transmission unit which causes a vehicle communication unit mounted on the vehicle and capable of communication via a first line and communication via a second line having a narrower bandwidth than a bandwidth of the first line, to transmit first sensor data, among the sensor data, having a matching degree less than a matching degree threshold to the map server by the communication via the first line, and transmit second sensor data, among the sensor data, having a matching degree equal to or greater than the matching degree threshold to the map server by the communication via the second line.

A data transmission method according to the present disclosure comprises the steps of generating sensor data representing a road environment of surroundings of a vehicle in a predetermined position based on a signal generated by a sensor mounted on the vehicle, calculating a matching degree between the road environment of the surroundings of the vehicle represented by the sensor data and a road environment in the predetermined position represented by map data stored in a map server in association with a position, and causing a vehicle communication unit mounted on the vehicle and capable of executing communication via a first line and communication via a second line having a narrower bandwidth than a bandwidth of the first line, to transmit first sensor data, among the sensor data, having a matching degree less than a matching degree threshold to the map server via the first line, and transmit second sensor data, among the sensor data, having a matching degree equal to or greater than the matching degree threshold to the map server via the second line.

According to the map update system of the present disclosure, highly important data can be reflected with priority in the updating of the map.

BRIEF DESCRIPTION OF DRAWINGS

Other features and advantages of the present invention will be apparent from the ensuing description, taken in conjunction with the accompanying drawings, in which.

DESCRIPTION OF EMBODIMENTS

The map update system will be described in detail below with reference to the drawings. The map update system comprises a data transmission device which is mounted on a vehicle and a map server in which map data is stored. The data transmission device generates sensor data representing a road environment of surroundings of the vehicle in a predetermined position based on a signal generated by a sensor mounted on the vehicle. Further, the data transmission device calculates a matching degree between the road environment of the surroundings of the vehicle represented by the sensor data and a road environment in the predetermined position represented by the map data. The data transmission device causes a communication circuit mounted on the vehicle to transmit the sensor data and information representing the matching degree to the map server. The map server has a communication device capable of communicating with the communication circuit, and updates the map data by utilizing first sensor data, among the sensor data received via the communication device, having a matching degree less than a matching degree threshold with a higher priority than second sensor data having a matching degree equal to or greater than the matching degree threshold.

As the main factor why the road environment of the surroundings of the vehicle and the road environment in the map data do not match, it is considered that the actual road environment has been changed after the map data has been updated. From the viewpoint of appropriately reflecting the changes of the actual road environment in the map data, the importance of the first sensor data, which has a matching degree lower than a matching degree threshold, is higher than that of the second sensor data, for which the matching degree is equal to or higher than the matching degree threshold. In the map update system according to the present disclosure, by performing processing as described above, highly important data can be reflected with priority in the updating of the map.

Figure 1:
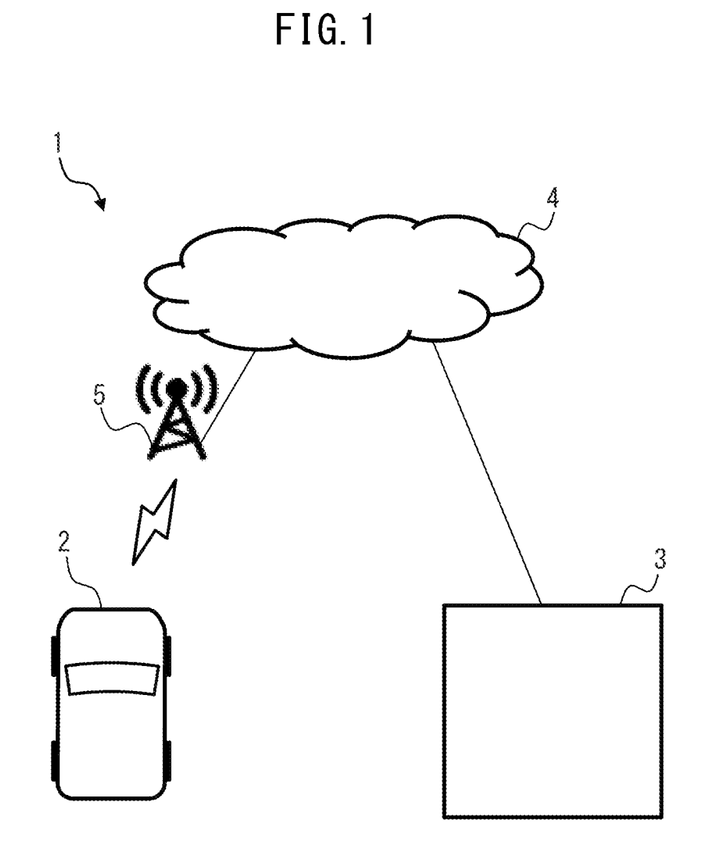
FIG. 1 is a schematic configuration view of a map update system.

FIG. 1 is a view detailing an outline of a map update system. In the present embodiment, the map update system 1 comprises a vehicle 2 having a data transmission device and a map server 3. The vehicle 2 is connected to the map server 3 via the wireless base station 5 and the communication network 4 by, for example, accessing the wireless base station 5 connected to the communication network 4 to which the map server 3 is connected via a gateway (not illustrated) or the like. Note that the map update system 1 may comprise a plurality of vehicles 2. Furthermore, in the map update system 1, a plurality of wireless base stations 5 may be connected to the communication network 4.

Figure 2:
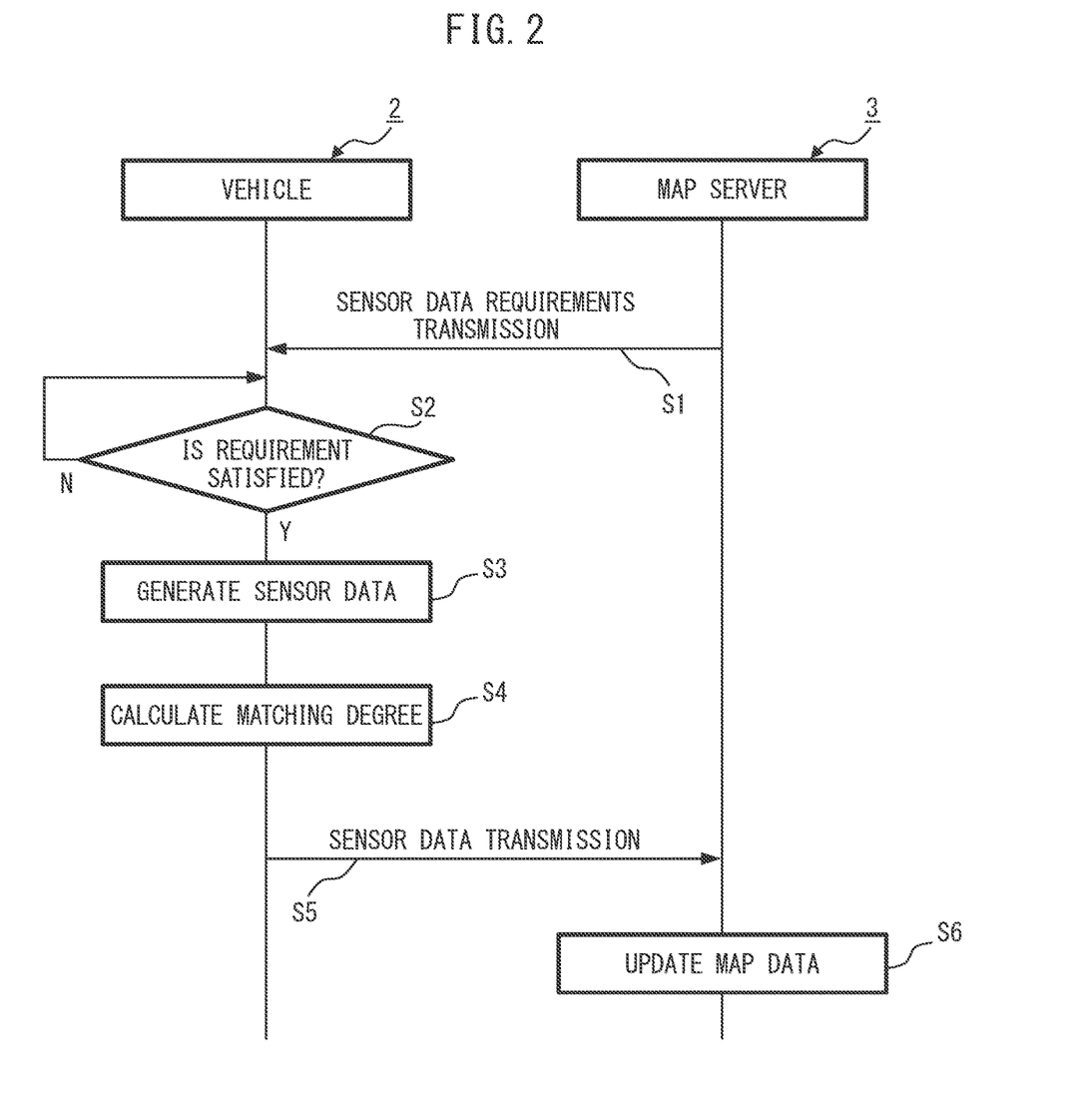
FIG. 2 is an operation sequence diagram of a map data collection and update process.

FIG. 2 is an operation sequence diagram of a map data collection and update process. The map update system 1 executes the map data collection and update process in accordance with the sequence diagram shown in FIG. 2.

The map server 3 transmits the requirement information representing the sensor data requirements for requesting transmission of the sensor data to the vehicle 2 via the communication network 4 and the wireless base station 5 at predetermined intervals (step S1).

The map server 3 stores the sensor data requirements in association with meshes obtained by dividing the map in a predetermined size in the latitude and longitude directions. The map server 3 requires new sensor data, for example, for a single mesh in which the map data has not been updated within one month. In this case, the map server 3 transmits the requirement information representing the sensor data requirements corresponding to "the vehicle is located in the mesh in question" to the vehicle 2.

Based on the received requirement information, the vehicle 2 determines whether the situation of the host vehicle satisfies the sensor data requirements (step S2), and repeats this determination until the situation of the host vehicle satisfies the sensor data requirements. When the sensor data requirements are designated for each mesh, the vehicle 2 determines whether or not the host vehicle position is included in the designated mesh.

If the situation of the host vehicle is determined to satisfy the sensor data requirements (step S2: Y), the vehicle 2 generates sensor data representing the road environment of the surroundings of the vehicle at the predetermined position based on the signal generated by the sensor mounted on the vehicle 2 (step S3). The sensor data is, for example, feature data representing a feature identified from image data generated by a camera, which is an example of the sensor.

The vehicle 2 calculates the matching degree between the road environment of the surroundings of the vehicle 2 represented by the sensor data and the road environment at the predetermined position represented by the map data (step S4). Then, the vehicle 2 transmits the sensor data together with information representing the matching degree to the map server 3 via the wireless base station 5 and the communication network 4 (step S5).

When the sensor data is received from the vehicle 2, the map server 3 updates the map by utilizing the first sensor data having a matching degree lower than the matching degree threshold with a higher priority than the second sensor data having a matching degree which is equal to or higher than the matching degree threshold (step S6).

Figure 3:
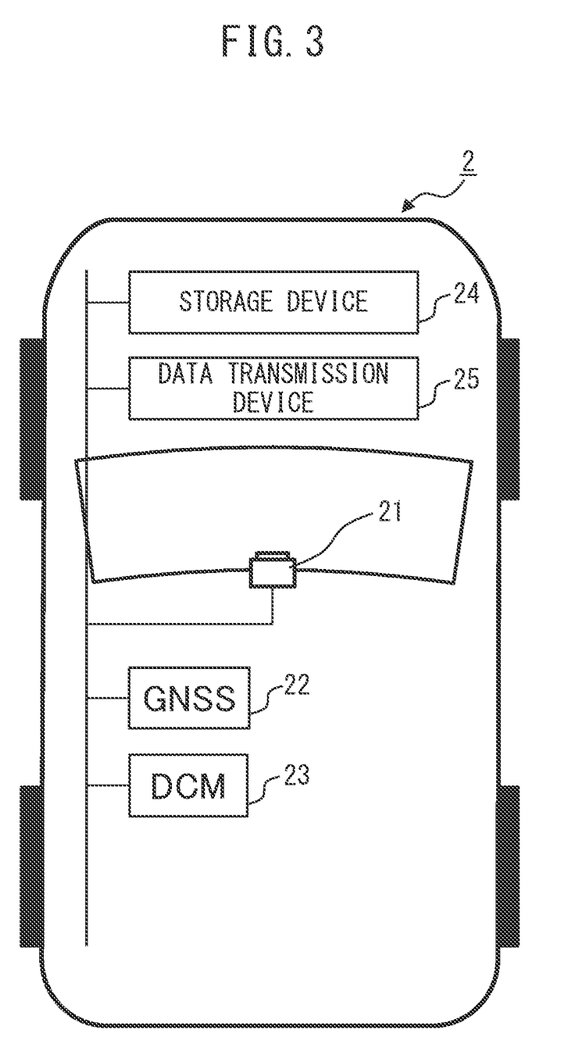
FIG. 3 is a schematic configuration view of a vehicle including a data transmission device.

FIG. 3 is a schematic configuration diagram of the vehicle 2 including the data transmission device. The vehicle 2 comprises a camera 21, a GNSS receiver 22, a DCM (data communication module) 23, a storage device 24, and a data transmission device 25. The camera 21, GNSS receiver 22, DCM 23, storage device 24, and the data transmission device 25 are communicatively connected via an in-vehicle network conforming to a standard such as controller area network.

The camera 21 is an example of a sensor and includes a two-dimensional detector composed of an array of photoelectric conversion elements sensitive to visible light, such as a CCD or a C-MOS, and an optical imaging system for capturing an image of an area to be photographed on the two-dimensional detector. The camera 21 is, for example, mounted in the vehicle interior of the vehicle 2 so as to face the front of the vehicle 2. The camera 21 photographs the front area of the vehicle 2 at predetermined captures cycles (for example, 1/30 sec to 1/10 sec) and generates images in which the front area is captured. The images obtained by the camera 21 may be color images or monochrome images. Note that a plurality of cameras may be provided in the vehicle 2, and the capture directions or focal lengths of the plurality of cameras may differ from each other.

Each time an image is generated, the camera 21 outputs the generated image to the data transmission device 25 via the in-vehicle network.

The GNSS receiver 22 receives a GNSS (Global Navigation Satellite System) signal from a GNSS satellite at predetermined periods and positions the position of the vehicle 2 based on the received GNSS signal. Each predetermined period, the GNSS receiver 22 outputs a positioning signal representing the positioning result of the position of the vehicle 2 based on the GNSS signal to the data transmission device 25 via the in-vehicle network.

The DCM 23 is an example of a communication circuit, and is a device which performs a wireless communication process conforming to a predetermined wireless communication standard such as so-called 4G (4th Generation) or 5G (5th Generation). The DCM 23 is connected to the map server 3 via the wireless base station 5 and the communication network 4 by, for example, accessing the wireless base station 5. The DCM 23 receives a downlink wireless signal from the wireless base station 5 and passes a sensor data transmission request signal indicating a sensor data transmission request from the map server 3, which is included in the wireless signal, to the data transmission device 25. Further, the DCM 23 includes data received from the data transmission device 25 in an uplink wireless signal, and transmits the wireless signal to the wireless base station 5 to transmit the data to the map server 3. Note that the DCM 23 may be implemented as a part of the data transmission device 25.

The storage device 24 has a hard disk device or a nonvolatile semiconductor memory. The storage device 24 stores map data representing the road environment in association with a position. Further, the storage device 24 temporarily stores image data obtained from the camera 21. The storage device 24 reads the image data in accordance with a request for reading the image data from the data transmission device 25, and passes the read image data to the data transmission device 25 via the in-vehicle network.

The data transmission device 25 generates sensor data based on the image data obtained from the camera 21, and calculates the matching degree between the road environment of the surroundings of the vehicle represented by the sensor data and the road environment at the predetermined position represented by the map data. Further, the data transmission device 25 causes the DCM 23 to transmit the sensor data and the information representing the matching degree to the map server 3. The data transmission device 25 may be implemented in the vehicle 2 as a drive recorder which causes the storage device 24 to store images representing the surroundings of the vehicle 2 generated by the camera 21 while the vehicle 2 is running.

Figure 4:
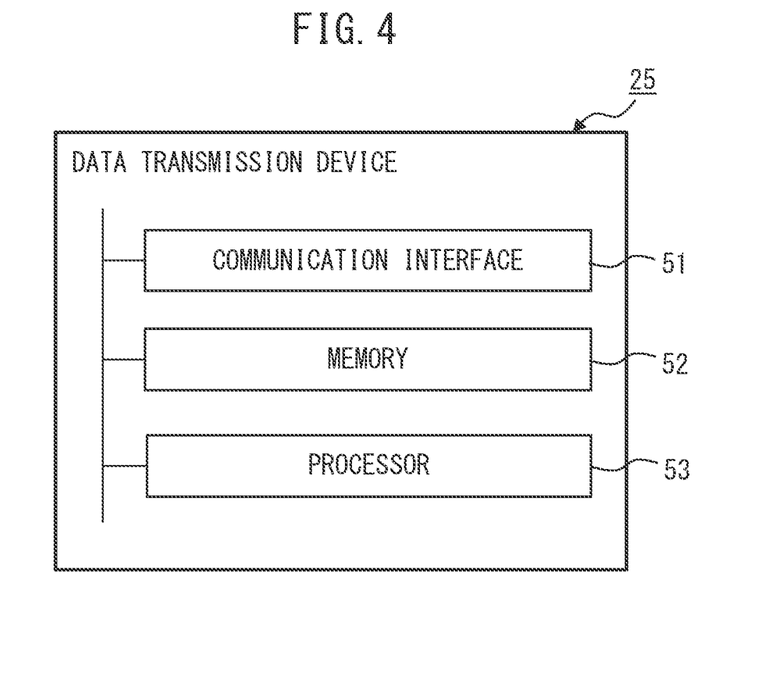
FIG. 4 is a hardware schematic of a data transmission device.

FIG. 4 is a schematic hardware diagram of the data transmission device 25. The data transmission device 25 comprises a communication interface 51, a memory 52, and a processor 53.

The communication interface 51 has a communication interface circuit for connecting the data transmission device 25 to the in-vehicle network. The communication interface 51 supplies the received data to the processor 53. The communication interface 51 outputs data supplied from the processor 53 to the outside.

The memory 52 has a volatile semiconductor memory and a nonvolatile semiconductor memory. The memory 52 stores various data used for processing by the processor 53, for example, the matching degree threshold for calculating the matching degree between the sensor data and the map data, etc. The memory 52 stores various application programs, for example, a data transmission program for executing data transmission control.

The processor 53 is an example of a control unit and has one or more processors and peripheral circuits therefor. The processor 53 may further include other arithmetic circuitry, such as a logical operation unit, a numerical operation unit, or a graphics processing unit.

Figure 5:
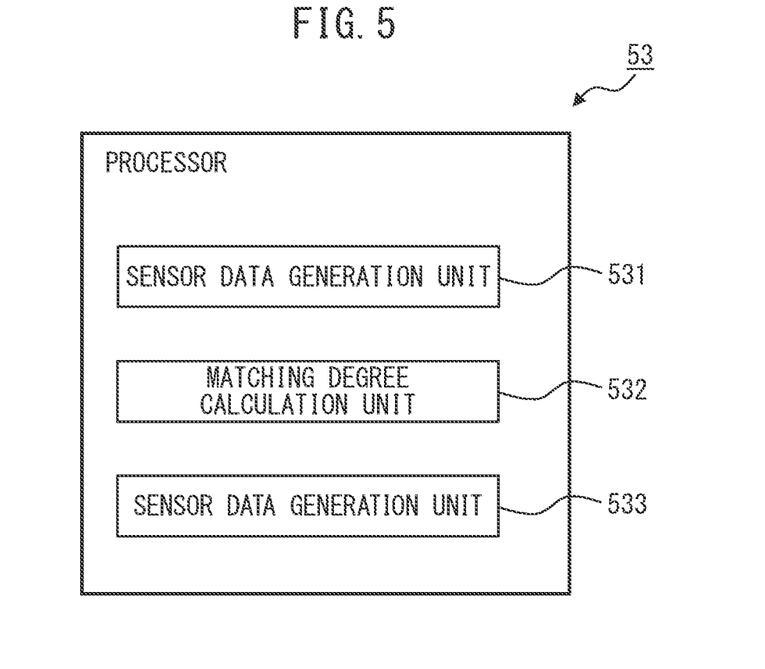
FIG. 5 is a functional block diagram of a processor included in a data transmission device.

FIG. 5 is a functional block diagram of the processor 53 of the data transmission device 25.

The processor 53 of the data transmission device 25 has, as functional blocks, a sensor data generation unit 531, a matching degree calculation unit 532, and a sensor data transmission unit 533. Each of these units of the processor 53 is a functional module implemented by a program running on the processor 53. Alternatively, each of these units of the processor 53 may be implemented in the data transmission device 25 as an independent integrated circuit, microprocessor, or firmware.

The sensor data generation unit 531 generates sensor data representing the road environment of the surroundings of the vehicle at the predetermined position based on the signal generated by a sensor mounted on the vehicle.

The sensor data generation unit 531 generates the sensor feature data by inputting an image obtained from the camera 21 to the classifier which has been trained in advance so as to detect feature represented in the image. Features include, for example, lane lines on roads, road markings, signs posted on roads, etc. A plurality of sets of feature data may be generated from one image.

The classifier can be, for example, a convolutional neural network (CNN) having a plurality of convolution layers connected in series from the input side toward the output side. The convolution layers perform a convolution operation to output a feature map. The CNN may further have a fully connected layer and an output layer. The fully connected layer joins all features contained in the feature map output by the convolution layers. The output layer inputs the output of the fully connected layer to an activation function and outputs the output value. A sigmoid function or a softmax function can be used as the activation function. By inputting the image including the features, the type of the features, and the position information of the area in which the features are included in advance into the CNN as teacher data and performing training, the CNN operates as a classifier which detects the area including the features from the images.

The sensor data generation unit 531 may generate a bird's-eye view image based on the image PIC obtained from the camera 21 as the sensor data by executing a viewpoint conversion process using information such as the mounting position of the camera 21 on the vehicle 2.

The matching degree calculation unit 532 calculates the matching degree between the road environment of the surroundings of the vehicle 2 represented by the sensor data and the road environment corresponding to the predetermined position represented by the map data.

Figure 6:
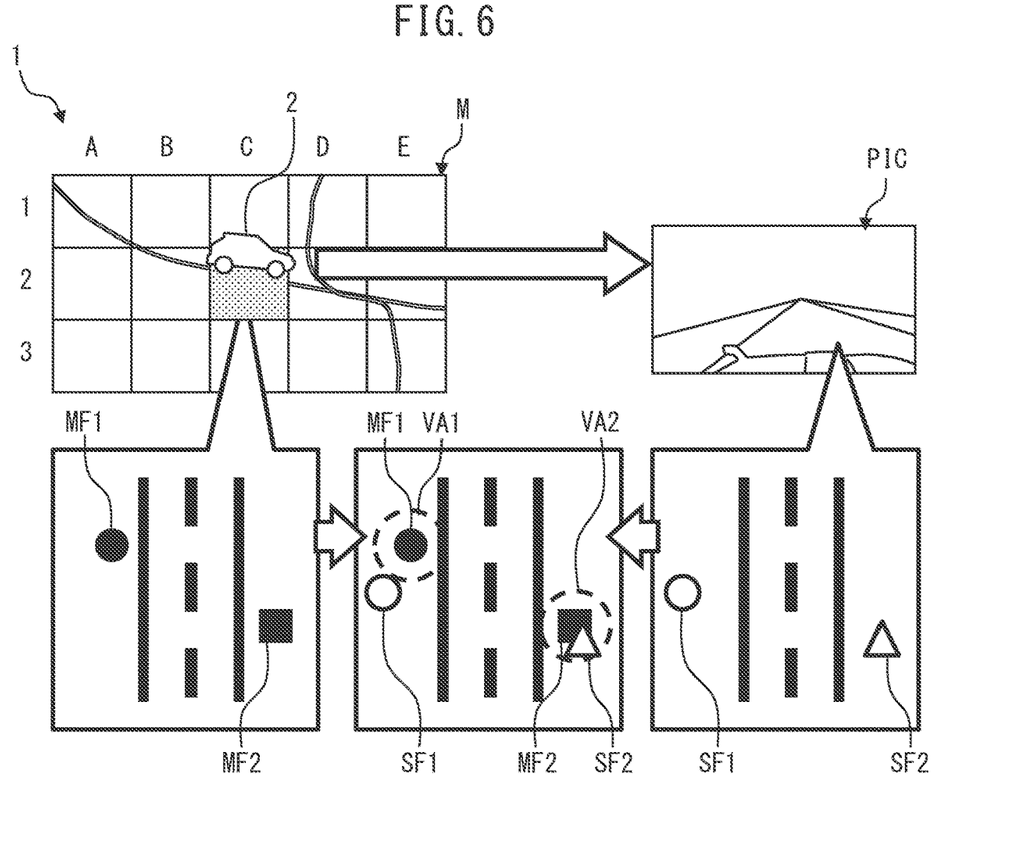
FIG. 6 is a view detailing examples of sensor data and map data.

FIG. 6 is a diagram illustrating examples of sensor data and map data.

In the map update system 1, the map server 3 manages the map M by dividing it into meshes of predetermined sizes. While the vehicle 2 travels through the mesh C-2 of the map M, the camera 21 mounted on the vehicle 2 outputs an image PIC representing the surrounding road environment of the vehicle 2.

The sensor data generation unit 531 generates sensor feature data SF1 and SF2 as the sensor data by inputting the image PIC to the classifier.

Further, the matching degree calculation unit 532 acquires the position information indicating the position of the vehicle 2 from the GNSS receiver 22. The position information is, for example, information identifying the mesh in the map M (mesh C-2). The position information may be latitude and longitude information corresponding to the positioning signal generated by the GNSS receiver 22.

Further, the matching degree calculation unit 532 acquires map data MF1 and MF2 located in the mesh C-2 represented in the sensor feature data SF1, SF2 from the storage device 24 in which the map data is stored. The matching degree calculation unit 532 may acquire the map data MF1 and MF2 located in the mesh C-2 from a server in which the map data is stored via the DCM 23, the wireless base station 5, and the communication network 4.

The matching degree calculation unit 532 calculates the matching degree between the sensor feature data SF1 and SF2 and the map feature data MF1 and MF2. The sensor feature data SF1 is outside the predetermined range VA1 around the map feature data MF1 and corresponds to the same type of feature as the map feature data MF1. Conversely, the sensor feature data SF2 is inside a predetermined range VA2 around the map feature data MF2 and corresponds to a different type of feature from the map feature data MF2.

In the example of FIG. 6, the matching degree calculation unit 532 determines a distance coefficient used for calculation of the matching degree of the sensor feature data based on whether the sensor feature data is inside the predetermined range around the corresponding map feature data. The distance coefficient when the sensor feature data is inside the predetermined range is set to be larger than the distance coefficient when the sensor feature data is outside the predetermined range. For example, the distance coefficient is 1.0 when the sensor feature data is inside the predetermined range, and is 0.5 when it is outside. Specifically, since the sensor feature data SF1 is outside the predetermined range VA1 around the map feature data MF1, the matching degree calculation unit 532 sets the distance coefficient of the matching degree of the sensor feature data SF1 to 0.5. Further, since the sensor feature data SF2 is inside the predetermined range VA2 around the map feature data MF2, the matching degree calculation unit 532 sets the distance coefficient of the matching degree of the sensor feature data SF2 to 1.0.

Further, in the example of FIG. 6, the matching degree calculation unit 532 determines the type coefficient used for calculating the matching degree of the sensor feature data based on whether the type of the sensor feature data and the type of the corresponding map feature data are the same. The type coefficient when the sensor feature data is identical to the map feature data is set to be larger than the type coefficient when it is different from the map feature data. For example, the type coefficient is 1.0 when the sensor feature data is identical to the map feature data, and the type coefficient is 0.1 when it is different. Specifically, since the type of the sensor feature data SF1 is the same as the type of the map feature data MF1, the matching degree calculation unit 532 sets the type coefficient of the matching degree of the sensor feature data SF1 to 1.0. Further, since the type of the sensor feature data SF2 is different from the type of the map feature data MF2, the matching degree calculation unit 532 sets the type coefficient of the matching degree of the sensor feature data SF2 to 0.1.

In the example of FIG. 6, the matching degree calculation unit 532 calculates the matching degree of each set of sensor feature data by multiplying the distance coefficient and the type coefficient for each set of sensor feature data. Specifically, the matching degree calculation unit 532 calculates the matching degree of the sensor feature data SF1 as 0.5× 1.0=0.5 (50%), and the matching degree of the sensor feature data SF2 as 1.0×0.1=0.1 (10%).

The sensor data transmission unit 533 outputs the sensor feature data SF1 and SF2 and the information representing the matching degree with the corresponding map feature data MF1 and MF2, respectively, to the DCM 23. The DCM 23 transmits the input data to the map server 3 via the wireless base station 5 and the communication network 4. The information representing the matching degree includes, for example, a value set according to whether or not the matching degree exceeds the predetermined matching degree threshold. For example, when the matching degree of a certain set of sensor data is 10%, which does not exceed 30%, which is the matching degree threshold, the sensor data transmission unit 533 outputs 0, which is a value indicating that the matching degree threshold has not been exceeded, to the DCM 23 as the information representing the matching degree. Further, when the matching degree of a certain set of sensor data is 50%, which exceeds the matching degree threshold, the sensor data transmission unit 533 outputs 1, which is a value indicating that the matching degree threshold has been exceeded, to the DCM 23 as the information representing the matching degree. It should be noted that the sensor data transmission unit 533 may output the value of the matching degree itself together with the sensor data to the DCM 23 as the information representing the matching degree.

The sensor data transmission unit 533 may transmit the sensor data having a matching degree lower than the predetermined matching degree threshold (e.g., 30%) to the DCM 23 by communication via a first line, and transmit the sensor data having a matching degree equal to or greater than the matching degree threshold by communication via a second line. The second line is a line having a narrower bandwidth than the bandwidth of the first line. The DCM 23 is configured to be capable of connecting to a plurality of lines. Specifically, the DCM 23 is configured to be capable of accessing a plurality of wireless base stations 5 which provide communications conforming to different communication standards. The sensor data transmission unit 533 uses, for example, a communication path for accessing one wireless base station 5 which provides communication conforming to, for example, 5G as the first line. Further, the sensor data transmission unit 533 uses, for example, a communication path for accessing another wireless base station 5 which provides communication conforming to, for example, 4G as the second line. Furthermore, one type of communication standard may be provided by the wireless base station accessible by the DCM 23. In this case, the DCM 23 attaches a tag which can be used to identify the first line and the second line to the data packet corresponding to the sensor data received from the sensor data transmission unit 533 and the information representing the matching degree in response to the designation by the sensor data transmission unit 533. The queuing of the data packets received by the wireless base station 5 is adjusted according to the attached tag, so that the bandwidth of the tagged data packets corresponding to the second line is controlled so as to be narrower than the bandwidth of the tagged data packets corresponding to the first line.

Figure 7:
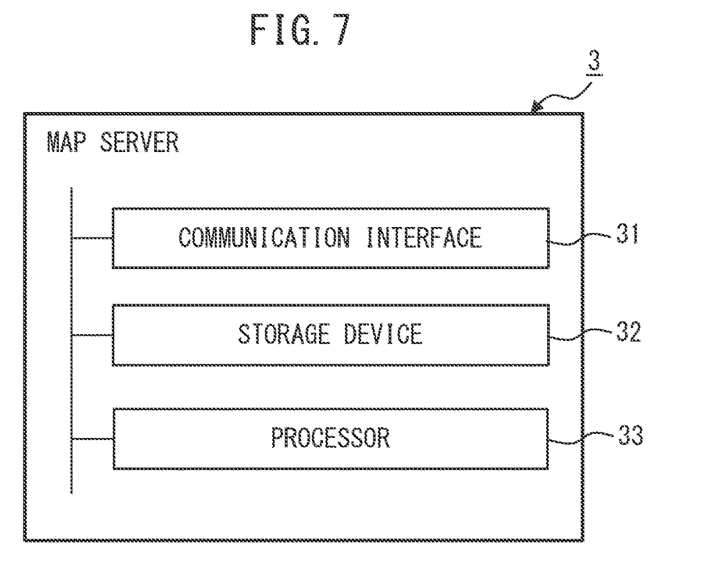
FIG. 7 is a hardware configuration view of a map server.

FIG. 7 is a hardware configuration diagram of the map server 3. The map server 3 receives data from the vehicle 2 via the communication network 4, and updates the map using the received data. To this end, the map server 3 includes a communication interface 31, a storage device 32, and a processor 33.

The communication interface 31 is an example of a communication device and includes an interface circuit for connecting the map server 3 to a communication network. The communication interface 31 is configured to be capable of communicating with the vehicle 2 via the communication network 4 and the wireless base station 5. Specifically, the communication interface 31 transmits the data transmission request signal received from the processor 33 to the vehicle 2 via the communication network 4 and the wireless base station 5. The communication interface 31 also passes image data or feature data received from the vehicle 2 via the wireless base station 5 and communication network 4 to the processor 33.

The storage device 32 is an example of a memory, and includes, for example, a hard disk device or an optical storage medium and an access device therefor. The storage device 32 stores image data or feature data received from the vehicle 2. The storage device 32 stores map data generated by the processor 33. Further, the storage device 32 may store computer programs for performing map update processing executed by the processor 33 and constants such as the matching degree threshold used in the computer programs.

The processor 33 has one or more CPUs (Central Processing Units) and peripheral circuitry therefor. The processor 33 may further include other arithmetic circuitry, such as a logic or numerical operation units.

Figure 8:
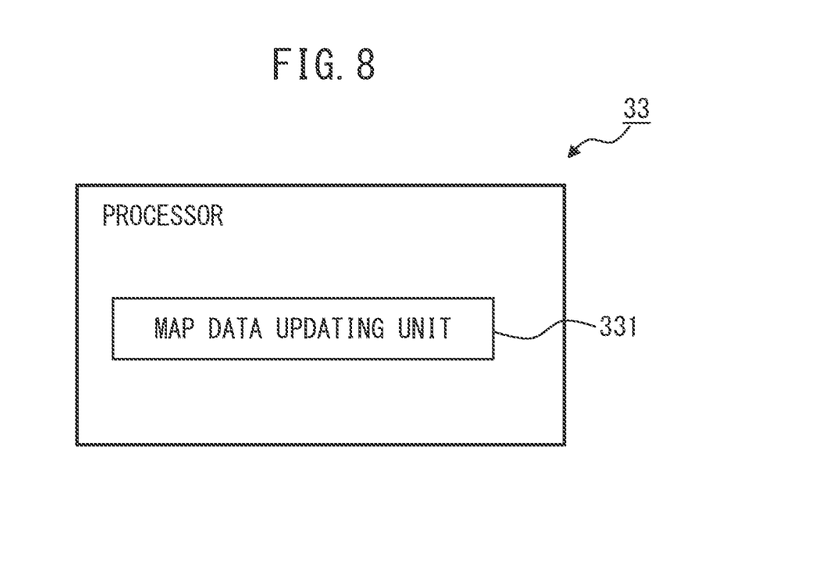
FIG. 8 is a functional block diagram of a processor included in a map server.

FIG. 8 is a functional block diagram of the processor 33 of the map server 3.

The processor 33 of the map server 3 includes a map data updating unit 331 as a functional block. The map data updating unit 331 is a functional module implemented by a program executed by the processor 33. Alternatively, the map data updating unit 331 may be implemented in the map server 3 as an independent integrated circuit, a microprocessor, or firmware.

The map data updating unit 331 determines whether or not the received sensor data is the first sensor data based on the information representing the matching degree transmitted together with the received sensor data. The map data updating unit 331 then updates the map data stored in the storage device 32 by utilizing the first sensor data having a matching degree lower than the matching degree threshold with a higher priority than the second sensor data having a matching degree equal to or higher than the matching degree threshold.

When no map data is present at the position of the sensor data, the map data updating unit 331 adds the features represented by the sensor data as the map data. Furthermore, when the position of the sensor data and the position of the map data are different from each other, the map data updating unit 331 changes the position of the map data to the position of the sensor data. When the features represented by the map data present in the position of the sensor data are different from the features represented by the sensor data, the map data updating unit 331 changes the features represented by the map data to the features represented by the sensor data.

When a value 0, indicating that the matching degree corresponding to the sensor data does not exceed the matching degree threshold, is received as the information representing the matching degree, the map data updating unit 331 determines that the received sensor data is the first sensor data. Further, when a value 1, indicating that the matching degree corresponding to the sensor data exceeds the matching degree threshold, is received as the information representing the matching degree, the map data updating unit 331 determines that the received sensor data is not the first sensor data. When the value of the matching degree itself corresponding to the sensor data is received as the information representing the matching degree, the map data updating unit 331 may compare the received matching degree value itself with the matching threshold value stored in the storage device 32 to determine whether or not the received sensor data is the first sensor data.

The map data updating unit 331 may perform predetermined preprocessing on the sensor data from the reception of the sensor data to the distribution of the map data. The predetermined preprocessing is, for example, a process of erasing an unnecessary portion contained in the sensor data, a format conversion of the sensor data, etc.

Figure 9A:
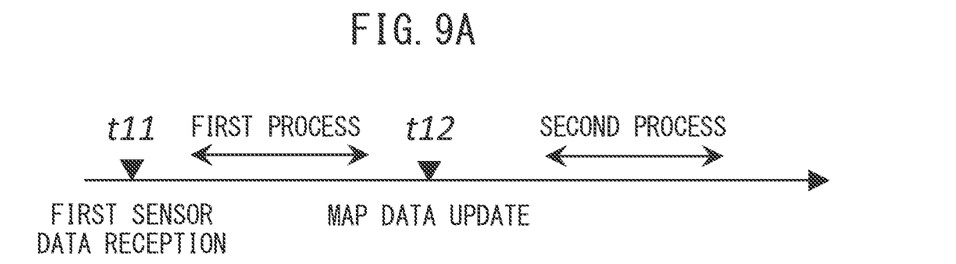
FIG. 9A is a view detailing the execution of preprocessing of first sensor data.
Figure 9B:
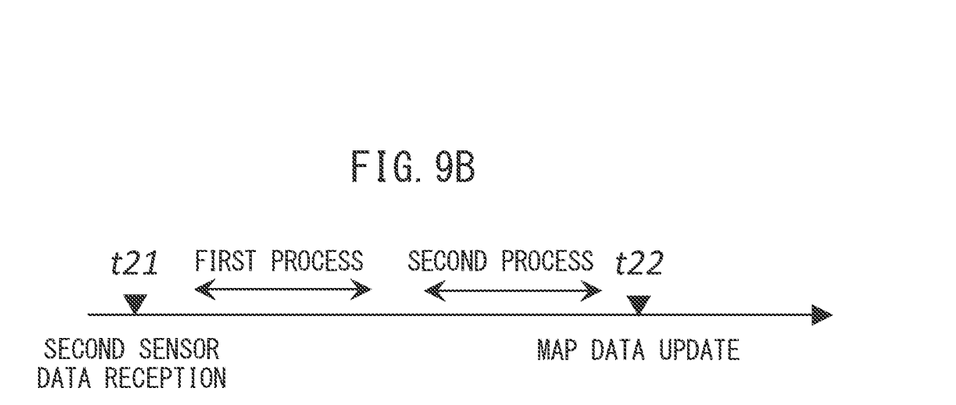
FIG. 9B is a view detailing the execution of preprocessing of second sensor data.

FIG. 9A-9B is a diagram detailing the execution of preprocessing of sensor data.

As shown in FIG. 9A, the map data update unit 331 executes the first process, which is a part of the predetermined preprocess, in the period from the reception of the first sensor data (time t11) to the updating of the map data (time t12) for the received first sensor data. The first process is, for example, a format conversion of sensor data. Further, the map data update unit 331 executes a second process different from the first process of the predetermined preprocess in the period after the updating of the map data (time t12) for the updated map data. The second process is, for example, the deletion of unnecessary portions contained in the sensor data.

As shown in FIG. 9B, the map data updating unit 331 performs the first process and the second process on the second sensor data in the period from the reception of the second sensor data (time t21) to the updating of the map data (time t22).

As described above, by performing a part of the preprocessing for the first sensor data after the updating of the map data, the map update system 1 can reflect the data having a higher importance in the updating of the map with a higher priority.

Figure 10:
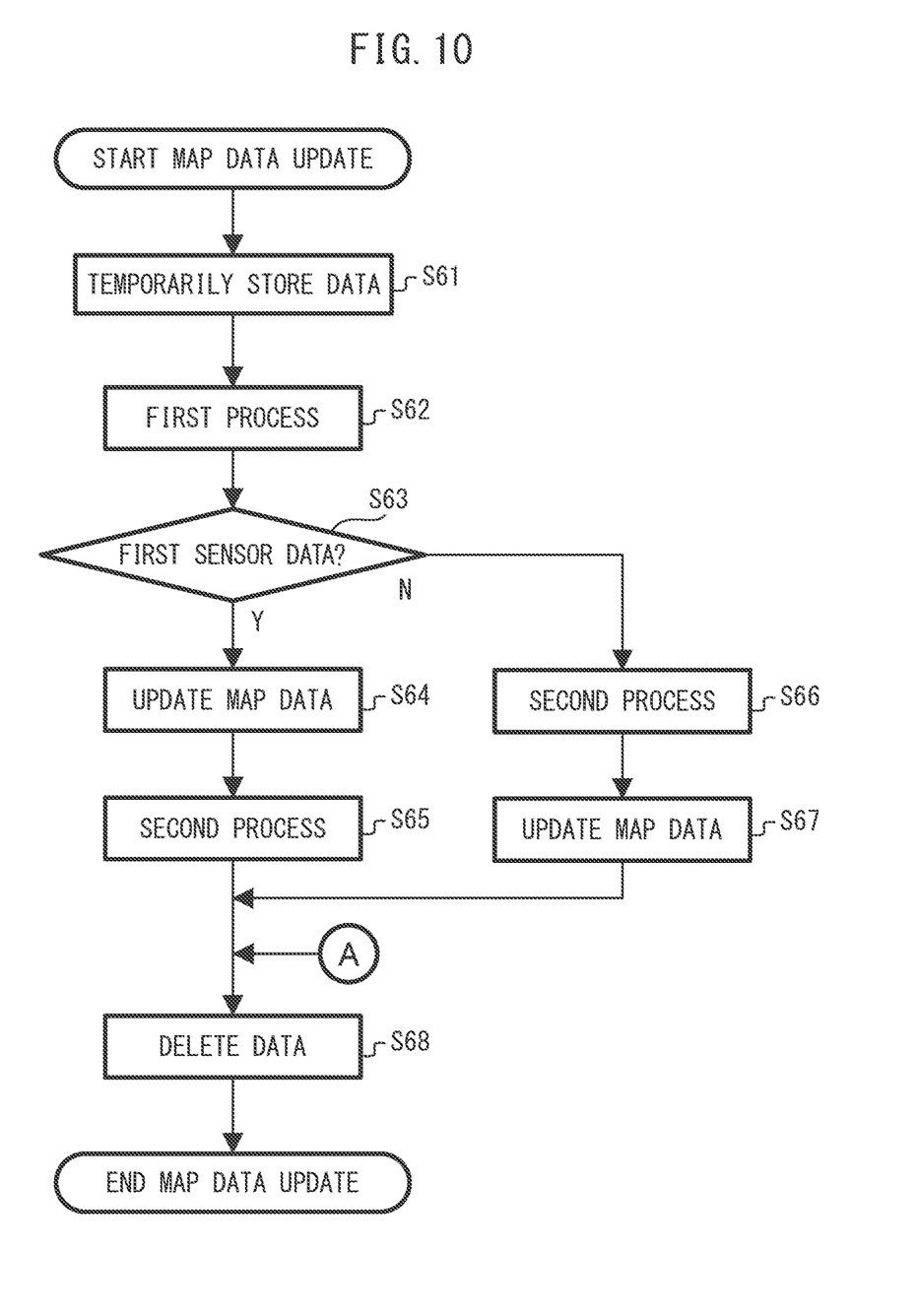
FIG. 10 is an operation flowchart of a map data update process.

FIG. 10 is an operation flowchart of a map data updating process. The map data updating unit 331 of the map server 3 executes the map data updating process in accordance with the following operation flowchart each time step S6 is called in the operation sequence of the map data collection and update process.

Note that the map data updating unit 331 need not perform the map data updating process every time the sensor data is received. For example, when the first sensor data is received, the map data updating unit 331 performs a map data updating process using the received first sensor data. Further, when the map data updating unit 331 receives the second sensor data, it suspends the operation of the map data updating process. Then, among the sensor data received during suspension, the map data updating unit 331 performs the map data updating process using the second sensor data when the number of sets of received third sensor data representing a road environment common to the road environment of the surroundings of the vehicle represented in the received second sensor data exceeds a numerical threshold value.

When the map data updating process is started, the map data updating unit 331 performs a temporary data storage process for temporarily storing the received sensor data in the storage device 32 (step S61). Details of the data temporary storage process will be described later.

Next, the map data updating unit 331 executes the first process, which is a part of a predetermined preprocessing (step S62). Next, the map data updating unit 331 determines whether or not the received sensor data is the first sensor data (step S63). When it is determined that the received sensor data is the first sensor data (step S63: Y), the map data updating unit 331 updates the map data with the sensor data subjected to the first process (step S64). The map data updating unit 331 executes the second process on the updated map data (step S65).

When it is determined that the received sensor data is not the first sensor data (step S63: N), the map data updating unit 331 performs the second process on the sensor data subjected to the first process (Step S66). Then, the map data updating unit 331 updates the map data with the sensor data that has been subjected to the second process (step S67).

Finally, the map data updating unit 331 deletes the temporarily stored sensor data from the storage device 32 (step S68), and the map data updating process ends. Note that, in step S68, the map data updating unit 331 may transmit the sensor data to another server which performs other processing on the sensor data before deleting the temporarily stored sensor data.

Figure 11:
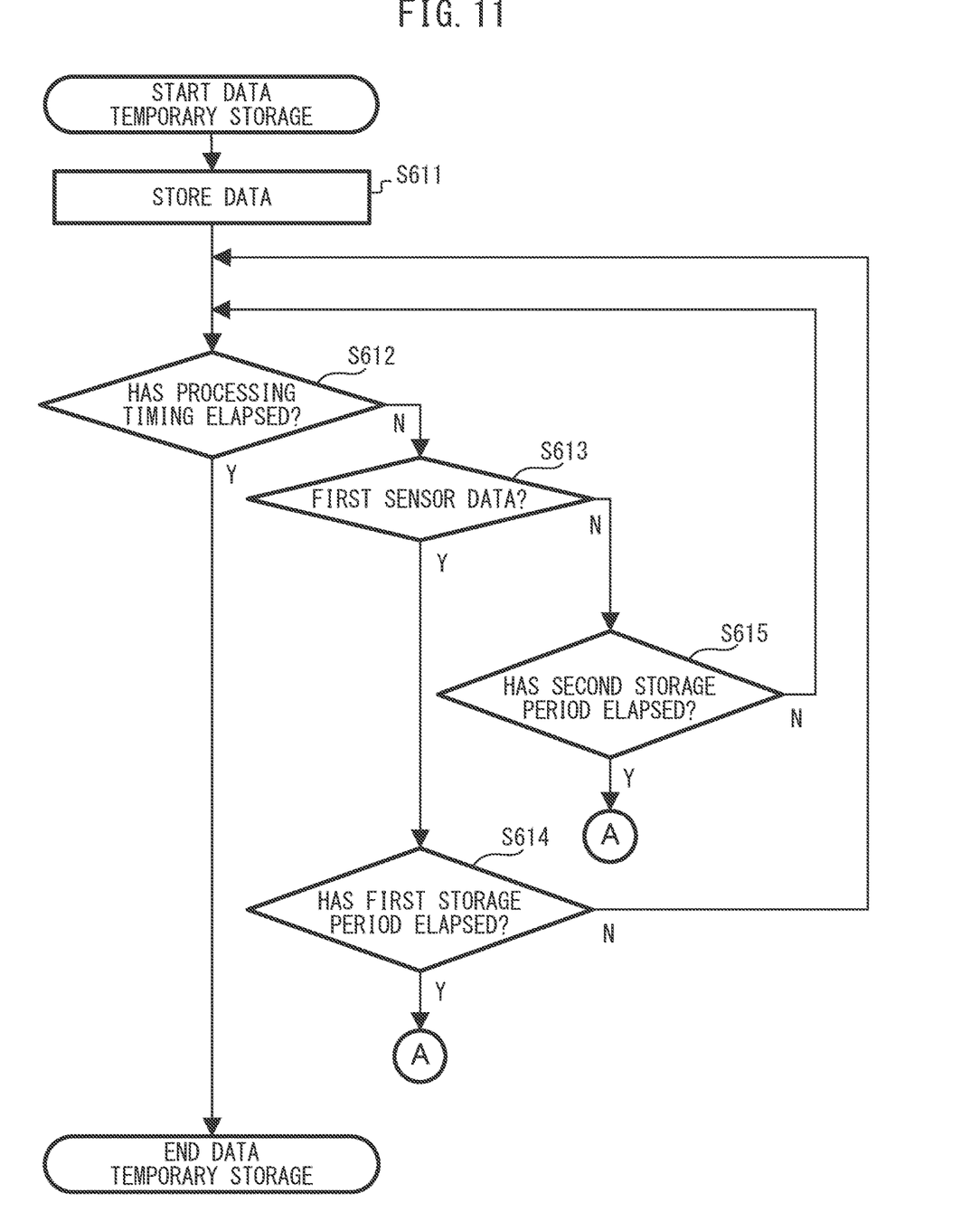
FIG. 11 is an operation flowchart of a data temporary storage process.

FIG. 11 is an operation flowchart of the data temporary storage process. Each time step S61 is called in the operation sequence of the map data updating process, the map data updating unit 331 of the map server 3 executes the data temporary storage process in accordance with the following operation flowchart.

First, the map data updating unit 331 stores the received sensor data in the storage device 32 (step S611). Next, the map data updating unit 331 determines whether or not a timing for processing the sensor data stored in the storage device 32 has elapsed (step S612). For example, the map data updating unit 331 selects, at predetermined time intervals, data having the oldest reception date and time among the sensor data stored in the storage device 32 as the data to be processed. In this case, it is determined that the process timing has elapsed when the target sensor data has the oldest reception date and time among the sensor data stored in the storage device 32. When it is determined that the timing for processing the sensor data has elapsed (step S612: Y), the map data update unit 331 ends the data temporary storage process.

When it is determined that the timing for processing the sensor data has not elapsed (step S612: N), the map data updating unit 331 determines whether the sensor data is the first sensor data (step S613). The first sensor data is sensor data having a matching degree lower than the predetermined matching degree threshold.

When it is determined that the sensor data is the first sensor data (step S613: Y), the map data updating unit 331 determines whether or not the predetermined first storage period has elapsed since the sensor data was stored in the storage device 32 (step S614). When it is determined that the first storage period has elapsed (step S614:Y), the process of the map data updating unit 331 proceeds to A in the map data updating process shown in FIG. 10, the sensor data is deleted from the storage device 32, and the map data updating process ends. If it is determined that the first storage period has not elapsed (step S614:N), the process of the map data updating unit 331 returns to step S612.

When it is determined that the sensor data is not the first sensor data (step S613: N), the map data updating unit 331 determines whether or not a predetermined second storage period has elapsed since the sensor data was stored in the storage device 32 (step S615). The second storage period is shorter than the first storage period. When it is determined that the second storage period has elapsed (step S615: Y), the process of the map data updating unit 331 proceeds to A in the map data updating process shown in FIG. 9, the sensor data is deleted from the storage device 32, and the map data updating process ends. If it is determined that the second storage period has not elapsed (step S615: N), the process of the map data updating unit 331 returns to step S612.

By performing the data temporary storage process in this manner, the map update system 1 stores the first sensor data having a low matching degree longer than the second sensor data having a high matching degree even when the processing timing does not come immediately, and the first sensor data can be used for updating the map data. Therefore, the map update system 1 can reflect highly important data in the map update with higher priority.

In the sequence of the map data collection and update process, the map server 3 may distribute the updated map data following the map data updating (step S6). Distribution of map data is performed via a communication network to devices such as the vehicle or a server in which the map data is stored. The map server 3 may not execute the distribution of the map data for each update of the map data. For example, the map server 3 may execute distribution of map data at predetermined intervals (e.g., 24 hours), for each predetermined number of map data update cases (e.g., 10).

In the map update system 1 of the present embodiment, the data transmission device 25 and the map server 3 execute the map data collection and update process as described above. Therefore, the map update system 1 can reflect highly important data in the map update with higher priority.

According to a modified example, the camera 21 may be a LIDAR (Light Detection and Ranging) sensor for acquiring a depth map representing the road environment of the surroundings of the vehicle 2. The depth map is a map in which each pixel has a value corresponding to the distance to the object represented by the pixel.

In the present modified example, the data transmitted by the data transmission device to the map server may be the distance image data itself generated by the LIDAR sensor.

A person skilled in the art would understand that various changes, substitutions, and modifications may be made without departing from the spirit and scope of the disclosure.

The invention claimed is:

1. A map update system, comprising a data transmission device mounted on a vehicle and a map server which stores map data, wherein
the data transmission device comprises a first processor which is configured to:
generate sensor data representing a road environment of surroundings of the vehicle in a predetermined position based on a signal generated by a sensor mounted on the vehicle,
calculate a matching degree between the road environment of the surroundings of the vehicle represented by the sensor data and a road environment in the predetermined position represented by the map data, and
transmit the sensor data and information representing the matching degree to the map server, and
the map server comprises:
a second processor which is configured to update the map data by utilizing first sensor data at a higher priority than second sensor data based on the first sensor data having a first matching degree less than a matching degree threshold and the second sensor data having a second matching degree greater than or equal to the matching degree threshold, wherein the first sensor data and second sensor data are among the sensor data received from the data transmission device, and wherein the a respective matching degree of a respective sensor data is based on a flag indicating that respective sensor feature identified by the respective sensor data is from within a respective predetermined area range.

2. The map update system according to claim 1, wherein the processor of the map server is further configured to update the map data so that a necessary update time elapsing from when the sensor data for the first sensor data is received to when it is used for updating the map data is shorter than the necessary update time for the second sensor data.

3. The map update system according to claim 1, wherein the map server further comprises a memory, and the processor of the map server is further configured to store the first sensor data in the memory during a first storage period and store the second sensor data in the memory during a second storage period, which is shorter than the first storage period.

4. The map update system according to claim 1, wherein the processor of the map server is further configured to: update the map data using the received first sensor data, and update the map data using the second sensor data when the number of sets of received third sensor data representing the road environment common in the road environment of the surroundings of the vehicle represented by the received second sensor data, among the sensor data, exceeds a numerical threshold.

5. The map update system according to claim 1, wherein the processor of the map server is further configured to execute, for the first sensor data, a first process, which is a part of a predetermined preprocess executed for the sensor data, from the reception of the first sensor data to the update of the map data, and execute a second process different from the first process in the predetermined preprocess after updating the map data, and execute, for the second sensor data, the first process and the second process from the reception of the second sensor data to the update of the map data.

6. The map update system according to claim 1, wherein the sensor is a camera which generates an image in which an environment of the surroundings of the vehicle is represented as the signal, and the processor of the data transmission device is further configured to: generate sensor feature data as the sensor data in which a feature identified by a classifier for identifying predetermined features from the image is represented as the road environment of the surroundings of the vehicle, and calculate a matching degree between the sensor feature data and map feature data in which a feature is represented as the road environment in the predetermined position represented by the map data as the matching degree.

7. A data transmission device, comprising a processor configured to:
generate sensor data representing a road environment of surroundings of a vehicle in a predetermined position based on a signal generated by a sensor mounted on the vehicle,
calculate a matching degree between the road environment of the surroundings of the vehicle represented by the sensor data and a road environment in the predetermined position represented by map data stored in a map server in association with a position, and
cause a communication circuit, mounted on the vehicle and capable of communication via a first line and communication via a second line having a narrower bandwidth than a bandwidth of the first line, to, based on a first sensor data having a first matching degree less than a matching degree threshold and a second sensor data having a second matching degree greater than or equal to the matching degree threshold, transmit the first sensor data, via the first line, at a higher priority than the second sensor data, wherein the first sensor data and second sensor data are among the sensor data received from the data transmission device, and wherein the a respective matching degree of a respective sensor data is based on a flag indicating that respective sensor feature identified by the respective sensor data is from within a respective predetermined area range.

8. A data transmission method, comprising:

generating sensor data representing a road environment of surroundings of a vehicle in a predetermined position based on a signal generated by a sensor mounted on the vehicle, calculating a matching degree between the road environment of the surroundings of the vehicle represented by the sensor data and a road environment in the predetermined position represented by map data stored in a map server in association with a position, and causing a communication circuit mounted on the vehicle and capable of executing communication via a first line and communication via a second line having a narrower bandwidth than a bandwidth of the first line, to, based on a first sensor data having a first matching degree less than a matching degree threshold and a second sensor data having a second matching degree greater than or equal to the matching degree threshold, transmit the first sensor data via the first line, at a higher priority than the second sensor data, wherein the first sensor data and second sensor data are among the sensor data received from the data transmission device, and wherein the a respective matching degree of a respective sensor data is based on a flag indicating that respective sensor feature identified by the respective sensor data is from within a respective predetermined area range.

* * * * *